US012485365B2

(12) United States Patent
Saleh

(10) Patent No.: US 12,485,365 B2
(45) Date of Patent: Dec. 2, 2025

(54) SYSTEM FOR SEPARATING OIL AND WATER MIXTURE USING HYDROPHILIC MODIFIED POLYSTYRENE AND HYDROPHOBIC POLYURETHANE

(71) Applicant: KING FAHD UNIVERSITY OF PETROLEUM AND MINERALS, Dhahran (SA)

(72) Inventor: Tawfik Abdo Saleh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 458 days.

(21) Appl. No.: 18/156,829

(22) Filed: Jan. 19, 2023

(65) Prior Publication Data

US 2024/0254014 A1    Aug. 1, 2024

(51) Int. Cl.
| | | |
|---|---|---|
| *B01D 17/00* | (2006.01) | |
| *B01D 71/28* | (2006.01) | |
| *B01D 71/54* | (2006.01) | |
| *C02F 1/00* | (2023.01) | |
| *C02F 1/40* | (2023.01) | |
| *C02F 101/32* | (2006.01) | |
| *C02F 103/08* | (2006.01) | |

(52) U.S. Cl.
CPC ......... *B01D 17/085* (2013.01); *B01D 71/281* (2022.08); *B01D 71/54* (2013.01);
(Continued)

(58) Field of Classification Search
CPC .... B01D 17/085; B01D 71/281; B01D 71/54; B01D 2317/08; B01D 2317/04;
(Continued)

(56) References Cited

U.S. PATENT DOCUMENTS 2,626,709 A * 1/1953 Krieble ............... B01D 17/045
                                                210/DIG. 5
5,456,842 A * 10/1995 Kibblehouse ............. C02F 1/44
                                                134/40
(Continued)

FOREIGN PATENT DOCUMENTS

| CN | 109621923 A | 4/2019 | |
| CN | 111760469 A * | 10/2020 | ............. B01D 71/34 |

(Continued)

OTHER PUBLICATIONS

Wang et al. 2022 "Tannic acid-based functional coating: surface engineering of membranes for oil-in-water emulsion separation" Chem. Commun., 2022, 58, 12629-12641 (Year: 2022).*

(Continued)

*Primary Examiner* — Liam Royce
(74) *Attorney, Agent, or Firm* — Oblon, McClelland, Maier & Neustadt, L.L.P.

(57) ABSTRACT

A system for separating an oil and water mixture including an oil and water mixture tank, a first membrane, a second membrane, a separated oil tank, and a separated water tank. The first membrane includes polystyrene, which is functionalized with tannic acid. Water passes through, and oil does not pass through the first membrane. The second membrane includes polyurethane, which is functionalized with an alkyl group. Oil passes through, and water does not pass through the second membrane.

20 Claims, 10 Drawing Sheets

(52) U.S. Cl.
CPC .............. *C02F 1/001* (2013.01); *C02F 1/006* (2013.01); *C02F 1/40* (2013.01); *C02F 2101/32* (2013.01); *C02F 2103/08* (2013.01)

(58) Field of Classification Search
CPC .............. B01D 67/00931; B01D 61/14; B01D 2323/02; B01D 2323/04; B01D 2323/21826; B01D 2323/2185; B01D 2323/38; B01D 2325/34; B01D 69/02; C02F 1/001; C02F 1/006; C02F 1/40; C02F 1/285; C02F 2101/32; C02F 2103/08
See application file for complete search history.

(56) References Cited

U.S. PATENT DOCUMENTS

| | | | |
|---|---|---|---|
| 2014/0014565 A1* | 1/2014 | Qin | ................ E02B 15/048 210/484 |
| 2023/0191369 A1* | 6/2023 | Ahmed | ................ C02F 1/40 502/402 |

FOREIGN PATENT DOCUMENTS

| | | | | |
|---|---|---|---|---|
| CN | 111841514 B | | 3/2022 | |
| CN | 115400608 B | * | 5/2025 | .............. A61M 1/16 |
| KR | 10-1969114 B1 | | 4/2019 | |
| WO | WO 2021/240150 A1 | | 12/2021 | |

OTHER PUBLICATIONS

Da-Seul Kim, et al., "Facile Fabrication of Superhydrophobic Polymer Membranes with Hierarchical Structure for Efficient Oil/Water Separation", Fibers and Polymers, vol. 23, Aug. 21, 2022, pp. 2365-2372 (Abstract only).

Yingying Zhao, et al., "Superwetting Polyvinlydene Fluoride Membranes with Micro-Nano Structure for Oil-in-Water Emulsion Separation", Macromolecular Materials and Engineering, vol. 307, Issue 4, Article No. 2100814, Jan. 13, 2022, 1 page (Abstract only).

Qianhui Cheng, et al., "Fabrication of a robust superhydrophobic polyurethane sponge for oil-water separation", Surface Engineering, vol. 35, Issue 5, 2019, pp. 403-410 (Abstract only).

* cited by examiner

SYSTEM FOR SEPARATING OIL AND WATER MIXTURE USING HYDROPHILIC MODIFIED POLYSTYRENE AND HYDROPHOBIC POLYURETHANE

STATEMENT OF ACKNOWLEDGEMENT

Support provided by King Fahd University of Petroleum and Minerals (KFUPM) is gratefully acknowledged.

BACKGROUND

Technical Field

The present disclosure is directed to a membrane system, and particularly, to a system for separating an oil and water mixture using hydrophilic modified polystyrene and hydrophobic modified polyurethane.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Mixtures of water contaminated with oil, or oil contaminated with water are two phase system in which the respective hases are not soluble or miscible with one another. Oil-water mixtures can be classified as immiscible mixtures and emulsions, as shown in FIGS. 1A-C. Oil spills and water contamination, along with liquid waste, frequently contain immiscible oil-water combinations. The densities of the oil and water create a stratification in immiscible oil-water combinations. Microdroplets (less than a micrometer to a few micrometers) of one liquid are scattered in the other in this form.

There is a need to separate the components of such multiphase mixtures. Conventionally, mechanical agitation, and the application of emulsifiers (as surface-active agents) are used to keep the suspended droplets from aggregating and rupturing in the emulsion. Commercial methods for breaking the resultant emulsions include settling, heating, distillation, centrifuging, electrical treatment, chemical treatment, and filtration.

Oil-water separation is useful in fuel technology. For example, small quantities of water in fuel can condense on an engine's metal surface, causing corrosion, which reduces the engine's service life and increases the risk of failure. In addition, the presence of water in fuel causes the oxidation of petroleum products. The presence of water in the fuel may also increase the mechanical wear of injection pumps and injectors in addition to causing nozzle and filter clogging, and plunger seizure. Also, water in the presence of carbon and nitrogen sources, and mineral nutrients leads to the growth of microorganisms. Microbial sludge adheres to a fuel/oil tank barrier and/or bottom, forming sites for localized corrosion attacks.

Precipitation, humidity, and the condensation of atmospheric moisture are all common ways in which water can enter and contaminate fuels. Water in fuels exists in the form of free water, emulsified water, and dissolved water. Traditional methods for oil separation, such as gravity-driven filtration, combustion, air flotation, biodegradation, and electrochemical techniques, cannot easily separate the oil and water phases due to respective tedious operations and incomplete oil separation. In gravity-driven filtration, wastewater must be pre-collected, and the removal or collection of the components after water absorption takes time. Thus, there is a need to develop alternative techniques for efficient oil-water separation.

Two types of oil-water separation materials have been traditionally used: inorganic particles, such as zeolites, silica, and activated carbon, and organic compounds, such as polymer-modified materials. Inorganic materials have many drawbacks, including low recyclability, insufficient buoyancy, and limited capacity. Organic compounds, on the other hand, are more commonly utilized in the cleanup of oil and organic pollution. Superoleophobic and superhydrophilic metal mesh, fabrics, and membranes have also been used to separate oil-water mixtures.

Although numerous oil-water separation techniques and associated materials have been described in the literature, conventional materials cannot withstand the rigorous requirements of actual use. Therefore, there is a need for the development of affordable, environmentally responsible, recyclable, and reusable materials, as well as simple and efficient oil-water separation technologies that can separate oil-water mixtures (including emulsions) with high efficiency and flux rates.

SUMMARY

In an exemplary embodiment, a system for separating an oil and water mixture is described. The system includes an oil and water mixture tank. The system includes a first membrane, a second membrane, a separated oil tank, and a separated water tank. The first membrane includes polystyrene, which is functionalized with tannic acid. The water passes through, and oil does not pass through the first membrane. The second membrane includes polyurethane, which is functionalized with an alkyl group. Oil passes through, and water does not pass through the second membrane.

In some embodiments, one or more styrene units of the polystyrene is functionalized with at least one oxygen atom. The tannic acid is covalently bonded to the polystyrene through the oxygen atom.

In some embodiments, the polystyrene is further functionalized with at least one compound selected from the group consisting of a glycol, a proanthocyanidin, an ellagitannin, and a flavonol. The compound is covalently bonded to the polystyrene through the oxygen atom.

In some embodiments, the polystyrene has a weight average molecular weight of 10,000-400,000 grams per mole (g/mol).

In some embodiments, the polystyrene is syndiotactic.

In some embodiments, the polystyrene includes 0.01 to 30 wt. % of the tannic acid based on the total weight of the polystyrene.

In some embodiments, the first membrane has a water flux of at least 25,000 liters per square meter per hour ($Lm^{-2}h^{-1}$) under gravity.

In some embodiments, the first membrane has a separation efficiency of at least 95%.

In some embodiments, the polystyrene is recycled from packing peanuts.

In some embodiments, a carbonyl group of one or more urethane units of the polyurethane is reduced and forms a covalent bond with the alkyl group.

In some embodiments, the polyurethane includes reacted units of a diisocyanate compound and a polyol compound.

The polyol compound is selected from the group consisting of ethylene glycol, propylene glycol, glycerol, sucrose, and sorbitol.

In some embodiments, the alkyl group is an alkyl chain with at least one unsaturated bond.

In some embodiments, the alkyl group has 4 to 40 carbon atoms.

In some embodiments, the second membrane has an oil flux of at least 23,000 $Lm^{-2}h^{-1}$ under gravity.

In some embodiments, the second membrane has a separation efficiency of at least 95%.

In some embodiments, the polyurethane includes 0.01 to 20 wt. % of the alkyl group based on the total weight of the polyurethane.

In some embodiments, the oil and water mixture tank has a first outlet connected to the first membrane and a second outlet connected to the second membrane. The first membrane is connected to the separated water tank. The second membrane is connected to the separated oil tank.

In some embodiments, the system further includes a pump. The pump is configured to pump the oil and water mixture through the first and second membranes.

In some embodiments, the oil is at least one selected from the group consisting of toluene, hexane, cyclohexane, dichloromethane, plant oil, isooctane, lubricating oil, crude oil, diesel oil, and gasoline.

In some embodiments, the oil and water mixture is wastewater or seawater after an oil spill.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1C:
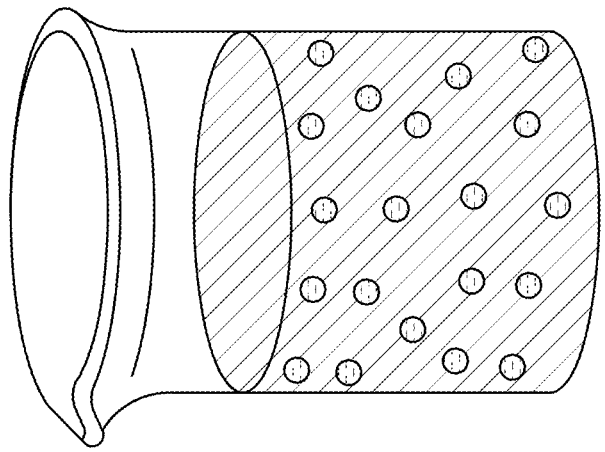
FIG. 1C is a schematic diagram of a miscible water-in-oil emulsion, according to certain embodiments of the present disclosure.
Figure 1B:
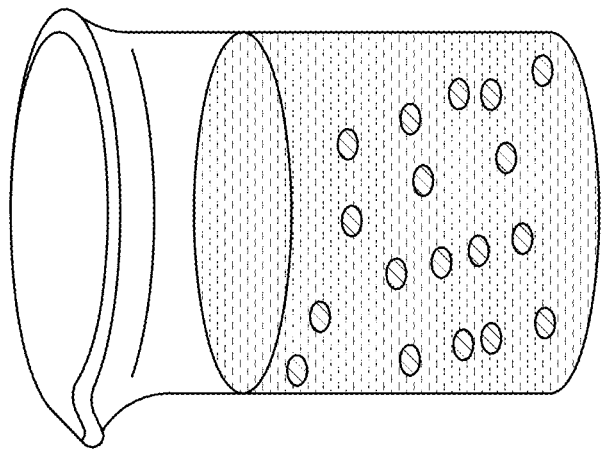
FIG. 1B is a schematic diagram of a miscible oil-in-water emulsion, according to certain embodiments of the present disclosure.
Figure 1A:
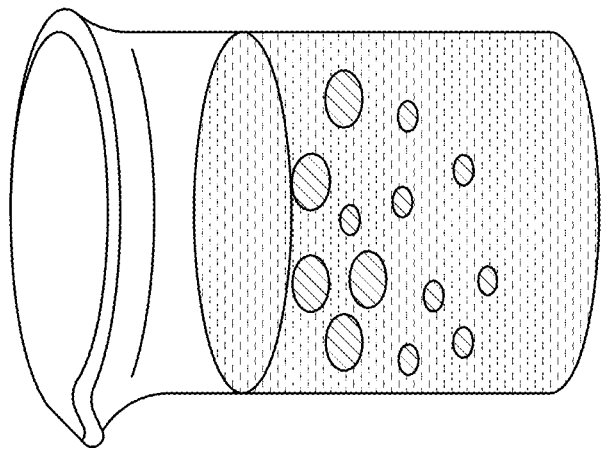
FIG. 1A is a schematic diagram of an immiscible oil-water mixture, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

All ranges disclosed herein are inclusive of the endpoints, and the endpoints are independently combinable with each other, and inclusive of all intermediate values of the ranges. Thus, ranges articulated within this disclosure, e.g., numerics/values, shall include the individual points within the range, sub-ranges, and combinations thereof.

As used herein, the term 'superhydrophilicity' refers to the phenomenon of excess hydrophilicity, or attraction to water; in superhydrophilic materials, the contact angle of water is approximately zero degrees.

As used herein, the term 'superoleophobicity' refers to the phenomenon where the contact angles of various oil droplets with low surface tension on a solid surface are larger than 150°.

As used herein, the term 'water contact angle' refers to the angle conventionally measured through the liquid, where a liquid-vapor interface meets a solid surface. The water contact angle quantifies the wettability of a solid surface by a liquid via the Young's equation. If the measured contact angle is above 90 degrees, the solid is said to have poor wetting and is termed hydrophobic. If the contact angle is below 90 degrees, the solid is said to have efficient wetting and is termed hydrophilic, e.g., ASTM D5946.

As used herein, the term 'syndiotactic' of a stereospecific polymer includes alternating stereochemical configurations of the groups on successive carbon atoms in the chain.

As used herein, the term 'water flux' refers to the product of inundation depth, the width of the channel, and depth-averaged current velocity.

As used herein, the term 'separation efficiency' refers to the ratio of concentration that has been removed from the feed stream to the initial concentration in the feed stream.

As used herein, the term 'water absorption capacity' refers to the amount of water absorbed by a material and is calculated as the ratio of the weight of water absorbed to the weight of the dry material.

Aspects of the present disclosure are directed to a system for separating an oil and water mixture. The system includes at least two membranes made of polystyrene and polyurethane functionalized with tannic acid and an alkyl group, respectively, to control respective wettability toward water and oil. Using these materials with wetting properties, such as superhydrophilicity and superoleophobicity, it is an effective system for separating oil and water mixtures.

In some embodiments, the oil and water mixture is wastewater or seawater after an oil spill. It may be understood by a person skilled in the art that the source of the wastewater or seawater can be a transport and fuel depot, refinery processes such as cooling water, condensed stripping steam, tank draw-off, and contact process water; and oil industry waste, oil refining waste, oil storage waste. In some embodiments, the oil and/or oil phase contains at least one selected from the group consisting of toluene, hexane, cyclohexane, dichloromethane, plant oil, isooctane, lubricating oil, crude oil, diesel oil, and gasoline. In some embodiments, the oil may include, but is not limited to, ethylbenzene, methylene chloride, or various mixtures.

Figure 2:
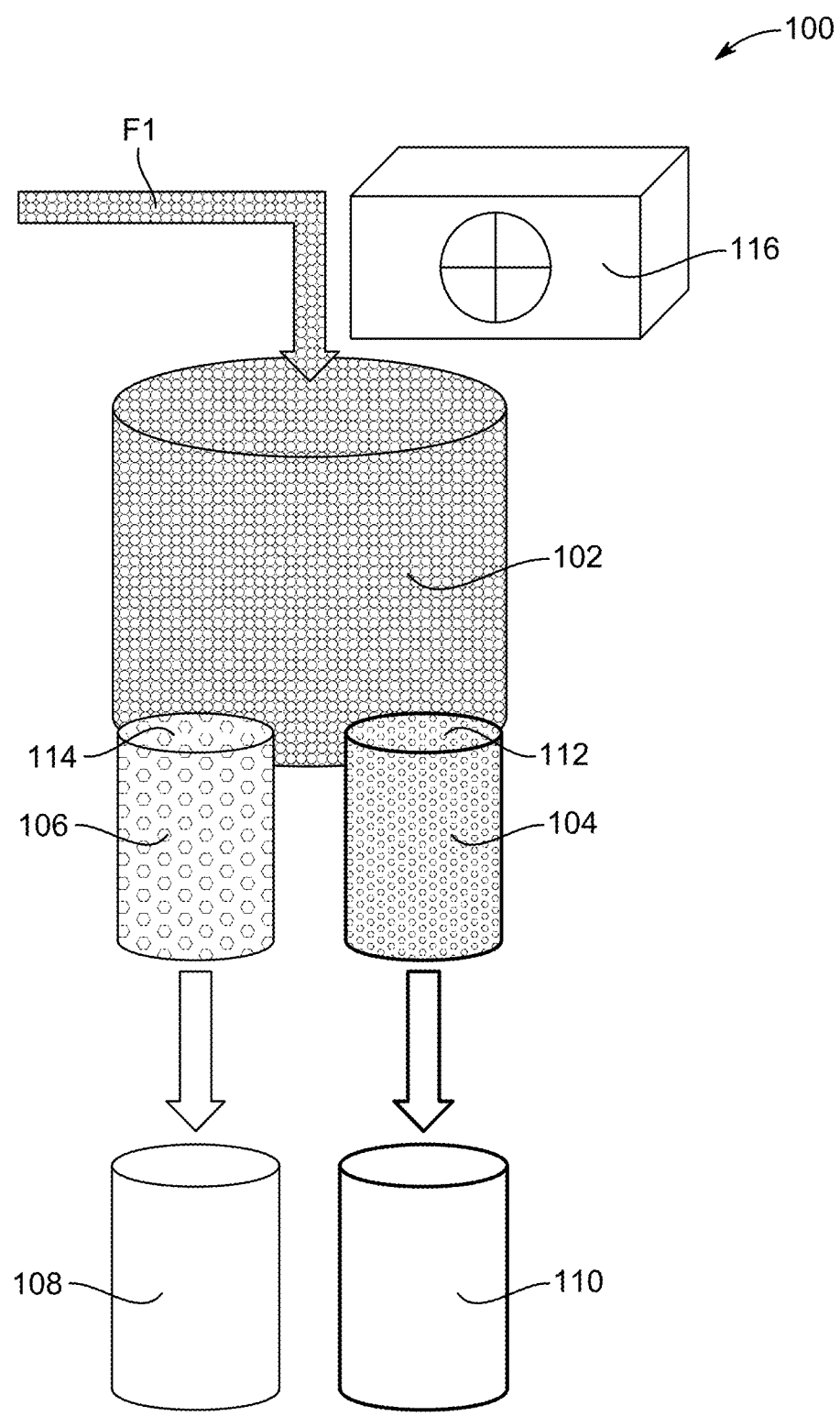
FIG. 2 is a schematic diagram of a system for the separation of an oil and water mixture, according to certain embodiments of the present disclosure.

For separating such oil and water mixtures, the system 100 of FIG. 2 is used. The system 100 includes an oil and water mixture tank 102. The oil and water mixture tank 102 is configured to hold the oil and water mixture prior to its separation. The oil and water mixture is obtained from the source and transported to the oil and water mixture tank 102. The system 100 further includes a first membrane 104, a second membrane 106, a separated oil tank 108, and a separated water tank 110.

The first membrane 104 includes polystyrene. The polystyrene is an abundant plastic material with high production that generates a very appreciable volume of consumer and non-recyclable waste. It is produced in various fiber forms, and the foam forms can be used in a wide array of applications. Polystyrene is difficult to recycle and its use or recycling has little business interest due to low economic return. Aspects of the present disclosure are directed at converting waste polystyrene fibers into valuable materials for oil-water separation. In some embodiments, the polystyrene is obtained and/or recycled from packing peanuts, plates, utensils, and/or Styrofoam. In some embodiments, the waste polystyrene is washed with water and an organic solvent such as but not limited to ethanol, methanol, and acetone to remove impurities. Polystyrene has a general structure of repeating units of styrene which includes a phenyl group and a two carbon chain as shown in Formula (I).

Polystyrene including waste polystyrene (also referred to as the polystyrene) may be functionalized. Functionalization alters the chemical and geometric structure of the polystyrene membrane thereby increasing its hydrophilic property, e.g., increasing the hydrophilic property of the first membrane 104. In some embodiments, cleaned polystyrene is treated with at least one strong acid, such as but not limited to nitric acid, sulfuric acid, hydrochloric acid, and hydrobromic acid. In some embodiments, the strong acid creates an active functional group (X) on the polystyrene chain as shown in Formula (I) below. In some embodiments, the active functional group (X) is a halogen, a hydroxyl, or a carboxylic acid group. In a preferred embodiment, the active functional group (X) is a hydroxyl group. In Formula (I), n is 2 to 100,000, preferably 100 to 50,000, 1,000 to 30,000 or approximately 10,000. In some embodiments, at least 30%, preferably 40%, 50%, 60%, 70%, 80%, 90%, or 100% of the phenyl groups of the polystyrene are functionalized with the active functional group (X).

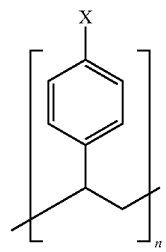

(I)

Figure 4:
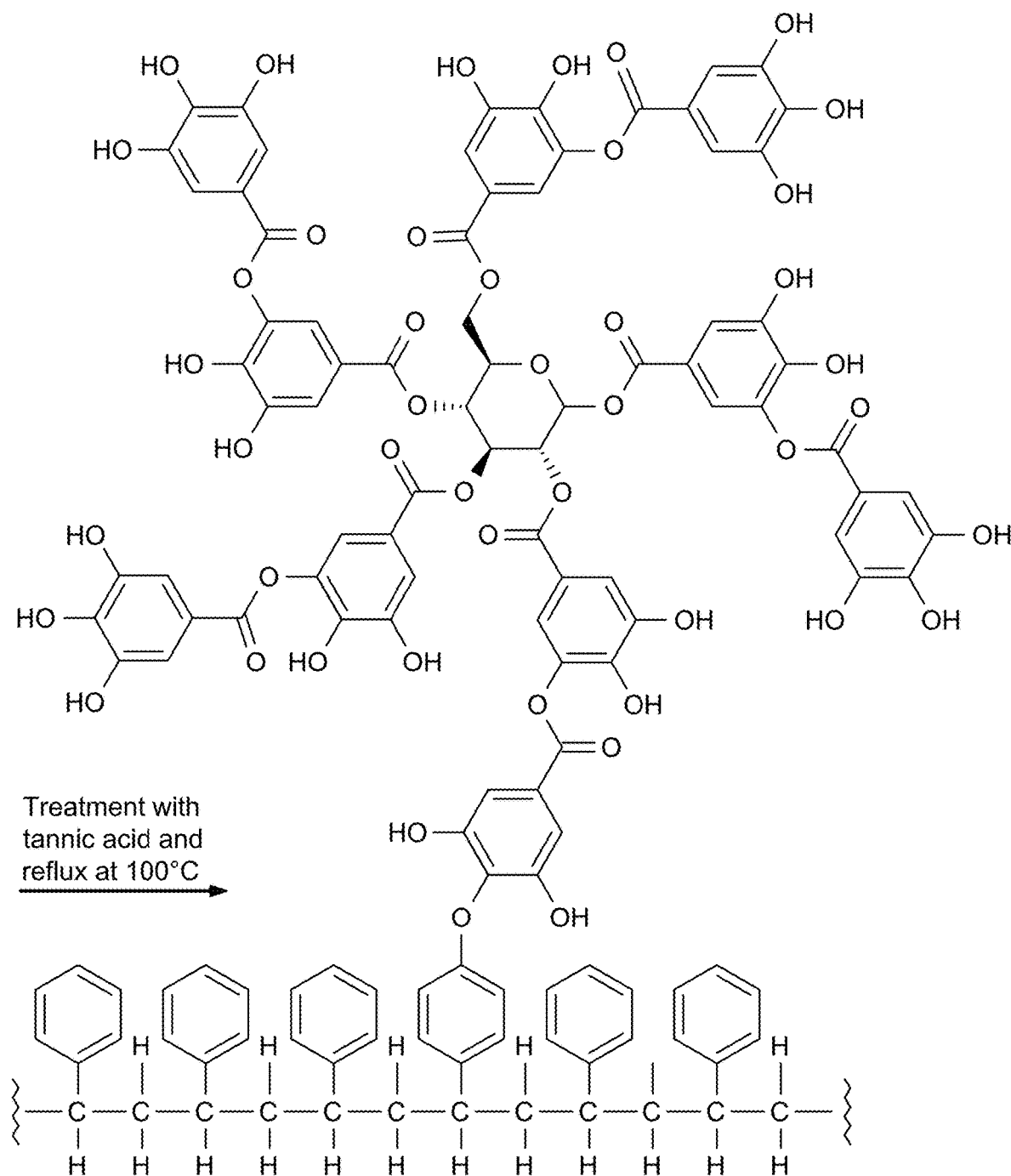
FIG. 4 is a schematic diagram depicting the functionalization of the active polystyrene with tannic acid, according to certain embodiments of the present disclosure.

In some embodiments, the activated polystyrene (Formula (I)) is further treated with a compound that covalently binds to the polystyrene through the active functional group (X). In some embodiments of the present disclosure the compound is tannic acid. In a preferred embodiment, the active functional group (X) is a hydroxyl group and the tannic acid is covalently bonded to the polystyrene through the oxygen atom as shown in Formula (II) below. In Formula (II), an alcohol group of the tannic acid is replaced by the bond to the polystyrene. In Formula (II), n is 2 to 100,000, preferably 100 to 50,000, 1,000 to 30,000 or approximately 10,000. An embodiment, of this is depicted in FIG. 4, however, one skilled in the art would recognize that the bond to the polystyrene could be through any of the alcohol groups on the tannic acid.

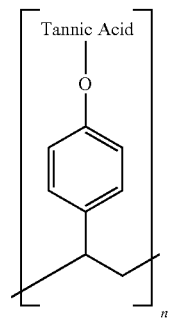

(II)

In some embodiments, the polystyrene includes 0.01 to 30 wt. %, more preferably 5 to 25 wt. %, and yet more preferably 10 to 25 wt. %, of the tannic acid based on the total weight of the polystyrene. In some embodiments, the polystyrene further includes an adhesion promoter such as silane, dopamine, dopamine peptide, methacrylate, and epoxy, covalently bonded to the polystyrene through another oxygen atom. In some embodiments, the polystyrene is further functionalized with at least one other compound selected from the group consisting of a glycol, a proanthocyanidin, an ellagitannin, and a flavonol which is also covalently bonded to the polystyrene through an oxygen atom.

Proanthocyanidins include polymerized units of at least one of the following but are not limited to catechin, epicatechin. Ellagitannins include but are not limited to castalagin, castalin, casuarictin, grandinin, oenothein B, roburin A, tellimagrandin II, terflavin B, vescalagin, punicalagin, and punicalin. Flavonols include but are not limited to 3-hydroxyflavone, azaleatin, fisetin, galangin, gossypetin, kaempferide, kaempferol, isorhamnetin, morin, myricetin, natsudaidain, pachypodol, quercetin, rhamnazin, and rhamnetin. In some embodiments, further functionalization with the other compound is on every other phenyl ring of the polystyrene and the tannic acid is on the other phenyl rings of the polystyrene. In other words, the polystyrene is functionalized with a 1:1 ratio of the tannic acid and the other compound. In some embodiments, less than 50% of the phenyl rings are functionalized with the other compound, preferably less than 40%, 30%, 20%, or 10%.

In some embodiments, the functionalized polystyrene has a weight average molecular weight of 10,000-400,000 grams per mole (g/mol), preferably 50,000-350,000 g/mol, 100,000-300,000 g/mol, 150,000-250,000, or approximately 200,000 g/mol. In some embodiments, the polystyrene is syndiotactic. In some embodiments, the polystyrene is amorphous and atactic.

In some embodiments, the first membrane 104 may include a plurality of sub-membranes. In an embodiment, the first membrane 104 may include two sub-membranes. For example, a first sub-membrane, in the first membrane 104, is made up of the polystyrene and the tannic acid, and the second sub-membrane, in the first membrane 104, may be made up of the polystyrene and one or more of the silane, the dopamine, the dopamine peptide, the methacrylate, and the epoxy. The two sub-membranes together form the first membrane 104.

In some embodiments, in the system 100 (FIG. 2), the water passes through, and oil does not pass through the first membrane 104. In an embodiment, the first membrane is superoleophobic underwater, and has an underwater oil contact angle of greater than 150°, preferably 150-160°, 152-158°, or 154-156°. In general, a superhydrophilic surface in the air often exhibits superoleophobicity underwater. This is due to the ability of the superhydrophilic material to trap water, resulting in a robust water layer. Moreover, due to oil immiscibility with the water layer, the material exhibits superoleophobicity when in contact with oil underwater.

In some embodiments, the first membrane has a water flux of at least 25,000 liters per square meter per hour ($Lm^{-2}h^{-1}$) under gravity, preferably 25,000 to 35,000 $Lm^{-2}h^{-1}$, or approximately 30,000 $Lm^{-2}h^{-1}$. In some embodiments, the first membrane has a separation efficiency of at least 95%, preferably 96%, 97%, 98%, 99%, or 100%. In some embodiments, the first membrane can be used 1 to 200 times, preferably 50 to 150, or approximately 100 times without effecting the water flux, separation efficiency or stability of the polystyrene.

The second membrane 106 includes polyurethane. The polyurethane includes reacted units of a diisocyanate compound (Formula (III)) and a polyol compound. In Formula (III), m is 1 to 5 carbon atoms, preferably 2 to 4, or approximately 3 carbon atoms.

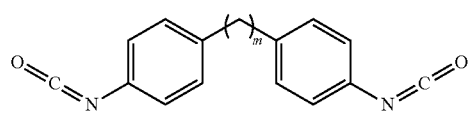

(III)

In some embodiments, the polyol has 2 to 4 alcohol groups, preferably 2 alcohol groups. The polyol compound is selected from the group consisting of ethylene glycol, propylene glycol, glycerol, sucrose, and sorbitol. The reacted units of the diisocyanate compound and the polyol compound form a polymer of Formula (IV). Formula (IV) depicts an embodiment wherein in Formula (III) m=1 and the polyol compound is ethylene glycol, however, one skilled in the art would recognize the structure for any suitable polyol compound or number of m in Formula (III) used. The linking of the diisocyanate compound and the polyol compound results in a urethane linkage as depicted in Formula (IV). In Formula (IV), k is 2 to 100,000, preferably 100 to 50,000, 1,000 to 30,000 or approximately 10,000.

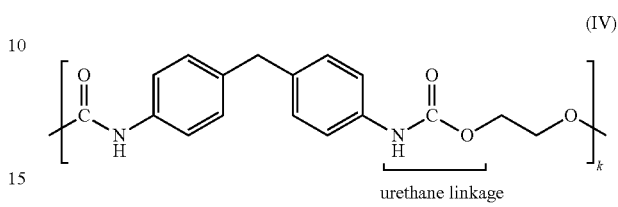

(IV)

urethane linkage

Polyurethane may be functionalized. The functionalized polyurethane has altered chemical properties and geometric structures when embodied as a polyurethane membrane, thereby increasing the hydrophobicity property of the second membrane 106. In some embodiments, the polyurethane is treated with at least one reducing agent selected from the group consisting of sodium borohydride and lithium aluminum hydride. In some embodiments, the reducing agent reduces the carbonyl (C=O) bond of one or more urethane linkages in the polyurethane and creates an active hydroxyl group. In some embodiments, at least 30%, preferably 40%, 50%, 60%, 70%, 80%, 90%, or 100% of the urethane carbonyls of the polyurethane are reduced to a hydroxyl group.

In some embodiments, the polyurethane is functionalized with an alkyl group at the active hydroxyl group as shown in Formula (V). In Formula (V), k is 2 to 100,000, preferably 100 to 50,000, 1,000 to 30,000 or approximately 10,000.

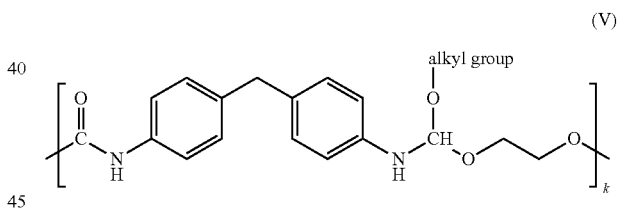

(V)

In some embodiments, the alkyl group has 4 to 40, more preferably 10 to 30, and yet more preferably 15 to 25, carbon atoms. In some embodiments, the alkyl group is an alkyl chain with at least one unsaturated bond. In some embodiments, the alkyl group may include, but are not limited to, methyl group, ethyl group, isopropyl group, sec-butyl group, isobutyl group, and tert-butyl group. The polyurethane includes 0.01 to 20 wt. %, more preferably 5 to 15 wt. %, and yet more preferably 10 to 13 wt. %, of the alkyl group based on the total weight of the polyurethane. The functionalizing of the polyurethane with the alkyl group increases the hydrophobic performance of the polyurethane. In some embodiments, the polyurethane with the functionalization has a weight average molecular weight of 50,000-1,000,000 g/mol, preferably 100,000-900,000 g/mol, 200,000-800,000 g/mol, 300,000-700,000, or 400,000 to 600,000 g/mol.

In some embodiments, the second membrane 106 may include a plurality of sub-membranes. In an embodiment, the second membrane 106 may include two sub-membranes. For example, a first sub-membrane, in the second membrane 106, is made up of the polyurethane and the alkyl group, and the second sub-membrane, in the second membrane 106, may be made up of the alkyl group and one or more of the polypropylene, the polyester, the polyvinyl chloride, the phenol resin, and the polyethylene. The two sub-membranes together form the second membrane 106.

The second membrane is configured to allow oil to pass through but not water. In some embodiments, the second membrane has an oil flux of at least 23,000 $Lm^{-2}h^{-1}$ under gravity, preferably 23,000 to 50,000 $Lm^{-2}h^{-1}$, 25,000 to 40,000 $Lm^{-2}h^{-1}$, or 30,000 to 35,000 $Lm^{-2}h^{-1}$. In some embodiments, the second membrane has a separation efficiency of at least 95%, preferably 96%, 97%, 98%, 99%, or 100%. In some embodiments, the second membrane can be used 1 to 200 times, preferably 50 to 150, or approximately 100 times without effecting the water flux, separation efficiency or stability of the polyurethane.

The first and second membranes are preferably disposed in separate separation vessels each having a cylindrical tubular form with an inlet at the top, a first outlet disposed on the outer circumferential surface of the cylindrical vessel and a second outlet disposed at a bottom face of the cylindrical vessel. Each membranes is arranged in a respective separation vessel in the form of a truncated cone in which the wide portion of the cone is in touch with the bottom face of the cylindrical vessel. The slanted walls of the truncated cone membrane aids to efficiently separate small amounts of a first component from an immiscible second component. One component exiting the cylindrical vessel through the first outlet and the other component exiting the cylindrical vessel through the second outlet.

In some embodiments, the first membrane 104 and the second membrane 106 may be arranged over a substrate, separately. The substrate may include a polymeric substrate, an inorganic filler, a ceramic substrate, a composite substrate, a metal substrate, an inorganic substrate, an inorganic substrate, an inorganic-organic substrate, and/or a casted substrate. In some embodiments, polymeric substrate may include polyacrylonitrile (PAN), polyester such as polyethylene terephthalate (PET), polycarbonate (PC), polyamide (PA), poly(ether) sulfone (PES), polybutylene terephthalate (PBT), polysulfone (PSf), polypropylene (PP), cellulose acetate (CA), poly(piperazine-amide), polyvinylidene difluoride (PVDF), polytetrafluoroethylene (PTFE), chlorinated polyvinyl chloride (CPVC), poly(phthalazinone ether sulfone ketone) (PPESK), polyamide-urea, polyether ether ketone (PEEK), poly(phthalazinone ether ketone), and thin film composite porous film (TFC). The substrate may include hydrophilic functional groups selected from hydroxyl, ketone, aldehyde, carboxylic acid, and amine groups. In some embodiments, the substrate may include hydrophilic material selected from cellulose acetate, quaternized polyethersulfone, polylactic acid, polyethyleneimine, polyetherimide, polyvinylpyrrolidone, and poly(vinyl alcohol). In some embodiments, the first membrane 104 and the second membrane 106 may include an oxidant, binder, epoxide, and crosslinker.

The first and second membranes are preferably disposed in separate separation vessels each having a cylindrical tubular form with an inlet at the top, a first outlet disposed on the outer circumferential surface of the cylindrical vessel and a second outlet disposed at a bottom face of the cylindrical vessel. Each membranes is arranged in a respective separation vessel in the form of a truncated cone in which the wide portion of the cone is in touch with the bottom face of the cylindrical vessel. The slanted walls of the truncated cone membrane aids to efficiently separate small amounts of a first component from an immiscible second component. One component exiting the cylindrical vessel through the first outlet and the other component exiting the cylindrical vessel through the second outlet.

In some embodiments, the oil and water mixture tank 102 has a first outlet 112 connected to the first membrane 104 and a second outlet 114 connected to the second membrane 106. The first membrane 104 is connected to the separated water tank 110. The second membrane 106 is connected to the separated oil tank 108. The system 100 further includes a pump 116. The pump 116 pumps the oil-water mixture with a flow rate 'F1' from sources connected to oil refineries, paper factories, textile and sugar mills, and chemical factories. The pump 116 is configured to pump the oil and water mixture through the first and second membranes 104, 106. The oil and water mixture tank 102, the separated oil tank 108, the separated water tank 110, the pump 116 may be made up of a material including one or more of iron, stainless steel, copper, aluminum, and plastic. The pump may be a centrifugal or rotary pump. The system 100 may also be used in leakage oil recovery and oiliness sewage treatment.

EXAMPLES

The following examples describe and demonstrate exemplary embodiments of the system for separating the oil and water mixture described herein. The examples are provided solely for the purpose of illustration and are not to be construed as limitations of the present disclosure, as many variations thereof are possible without departing from the spirit and scope of the present disclosure.

Example 1: Materials

Polystyrene, acetone, nitric acid, sulfuric acid, tannic acid, polyurethane, ethanol, sodium borohydride ($NaBH_4$), methanol, chloro-octadecane, and pyridine.

Example 2: Preparation of the First Membrane 104

Figure 3:
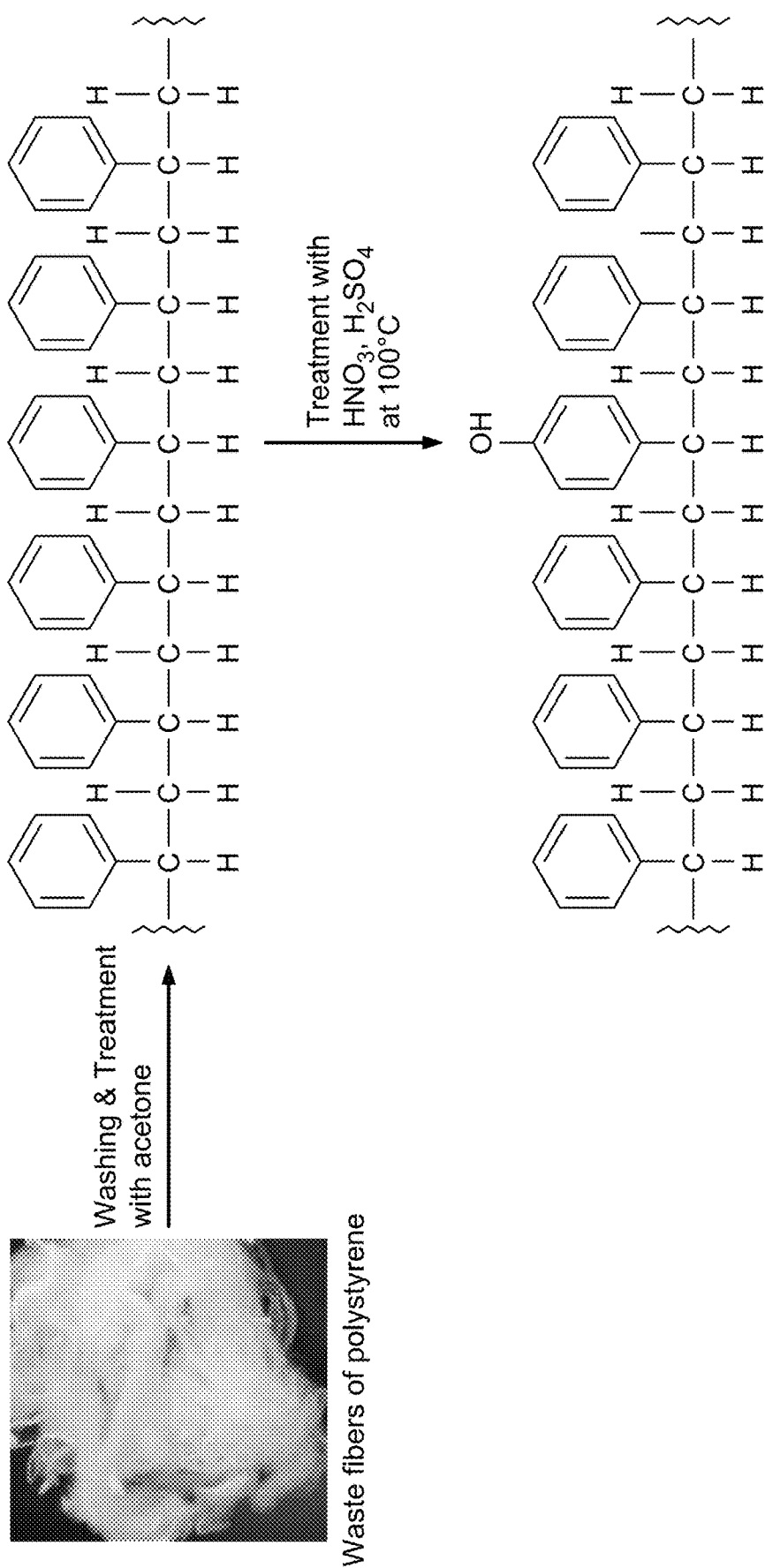
FIG. 3 is a schematic diagram depicting the conversion of polystyrene to active polystyrene, according to certain embodiments of the present disclosure.

Herein, waste PS fibers are used in the first membrane. Waste polystyrene was washed with water to remove impurities and further treated with acetone under sonication for 2 hours to remove organic impurities. Next, the cleaned polystyrene was treated with nitric acid (0.2 molar (M)) and sulfuric acid (0.1 M) under reflux at 100° C. for 3 hours to create active functional groups such as hydroxyl groups on the polystyrene chain as shown in FIG. 3. The obtained active polystyrene was then treated with tannic acid for 3 hours under reflux at 100° ° C. to obtain a tannic-modified polystyrene as shown in FIG. 4. The obtained tannic-modified polystyrene was collected and dried at 50° C., and was then used as the first membrane 104 for the separation of water from oil-water mixture.

Example 3: Separation of Water from Oil-Water Mixture with the First Membrane

The modified polystyrene, as prepared above, was used to perform the water-oil separation technique. A circular piece of modified polystyrene was completely wet using water before performing the separation tests. Owing to the water film's high repelling qualities and the hydrophilic characteristic property of the prepared modified polystyrene, the water permeated to the flask while the oil remained above it. The water was then collected and weighed to determine water absorption capacity, separation efficiency, and flux.

The oil was allowed to be in contact with the modified polystyrene until all the water had been collected. The separation procedure was performed 50 times to ensure the modified polystyrene reusability.

The water absorption capacity (Q) was calculated using equation (1) from the weight ratio.

$$Q = \frac{W_i - W_0}{W_0}, (1 \leq i \leq 50) \qquad (1)$$

where $W_i$ refers to the weight of the modified polystyrene after the oil-water separation test, and $W_0$ denotes the weight of the fresh modified polystyrene. The weight $W_i$ of the modified polystyrene absorbing water was determined immediately after each cycle in the oil-water separation test.

Gravity-driven separation efficiency and flux are calculated using equations (2) and (3), respectively.

$$\text{Seperation efficiency (\%)} = \frac{M}{M_0} \times 100\% \qquad (2)$$

$$\text{Flux} = \frac{V}{A \times \Delta t} \qquad (3)$$

where $M_0$ and M denote the mass of water before and after separation. V is the volume of water permeating the modified polystyrene, $\Delta t$ is the period of permeation, and A is the area of the modified polystyrene. Each defined value was calculated by considering 50 cycles.

The porosity of the modified polystyrene was determined using a method previously reported in the literature. It was calculated using equation (4).

$$\text{Porosity (\%)} = \frac{m_{eth} - m_0}{\rho V} \times 100\% \qquad (4)$$

where V and $m_0$ are respectively the volume and weight of dry-modified polystyrene. $m_{eth}$ is the mass of the modified polystyrene saturated with ethanol, and $\rho$ indicates the density of ethanol (0.789 grams per cubic centimeter (g/cm$^3$)).

Figure 5:
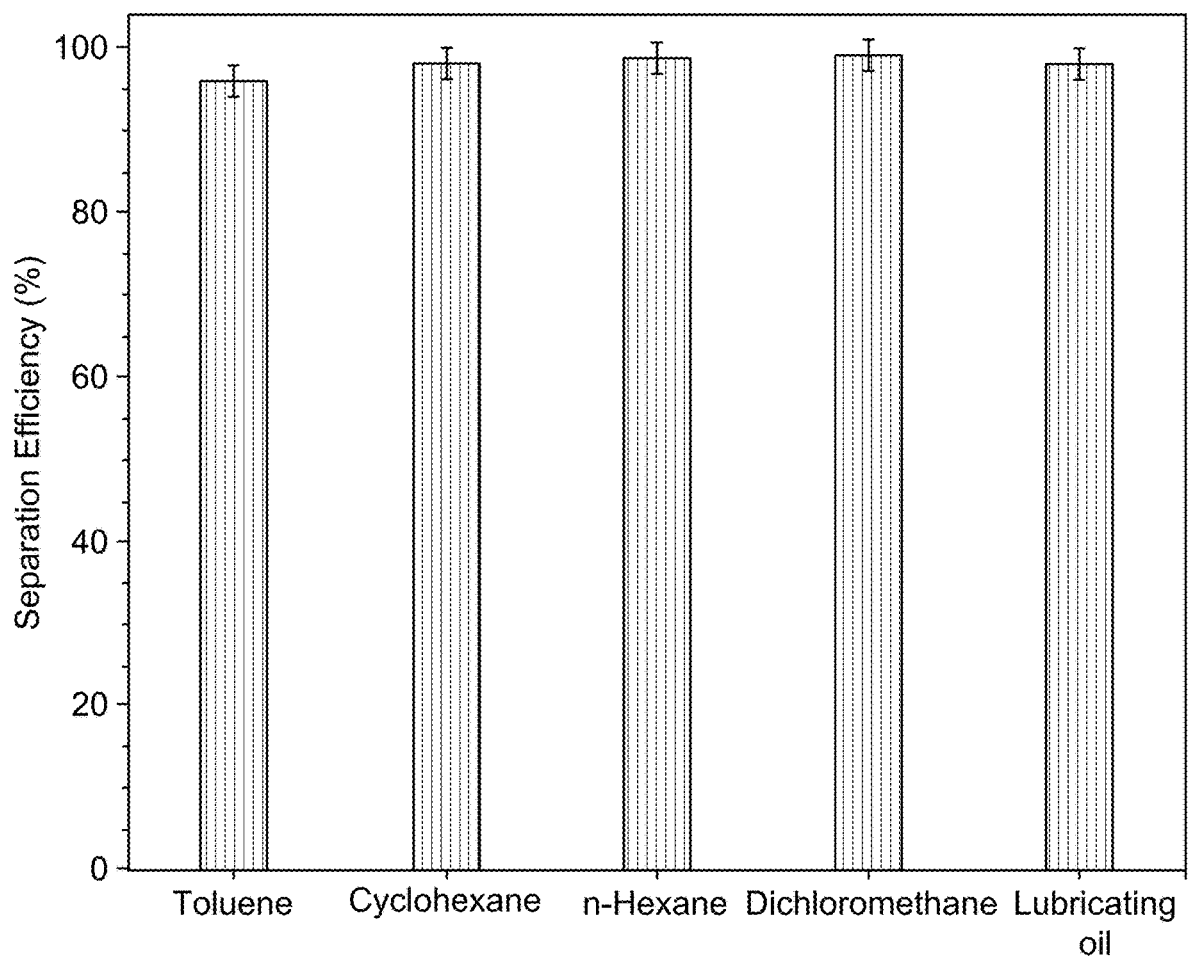
FIG. 5 is a graph depicting the separation efficiency of the modified polystyrene in the presence of various organic oily compounds, according to certain embodiments of the present disclosure.
Figure 6:
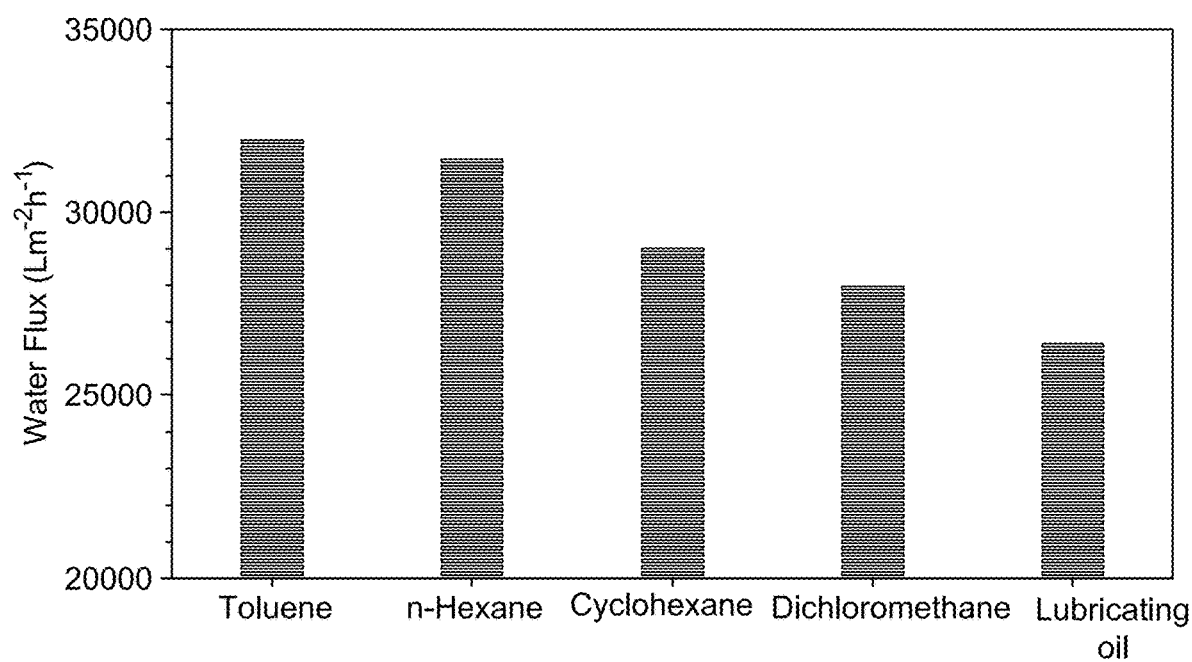
FIG. 6 is a graph depicting the water flux of the modified polystyrene in the presence of various organic oily compounds, according to certain embodiments of the present disclosure.

Dynamic hydrophilicity of the modified polystyrene was demonstrated through water permeability. Due to its lower mass-transfer resistance, the improved wettability of the modified polystyrene resulted in an increase in water permeability, making it easier for water molecules to quickly pass through the modified polystyrene sample and drop into an Erlenmeyer flask. The modified polystyrene showed high separation efficiency, as shown in FIG. 5. Water could pass through the modified polystyrene, simply under gravity, with a water flux of around 32000, 31500, and 29000 Lm$^{-2}$h$^{-1}$ when using toluene, n-hexane, and cyclohexane respectively (FIG. 6). Such large water flux value was attributed to the robust hydrophilicity of the modified polystyrene. Meanwhile, oil remains above the modified polystyrene due to the underwater superoleophobicity of the modified polystyrene. Rapid water diffusion and easy saturation are features of the modified polystyrene that enable fast separation and cleanup of oil spills.

Example 4: Preparation of the Second Membrane 106

Figure 7:
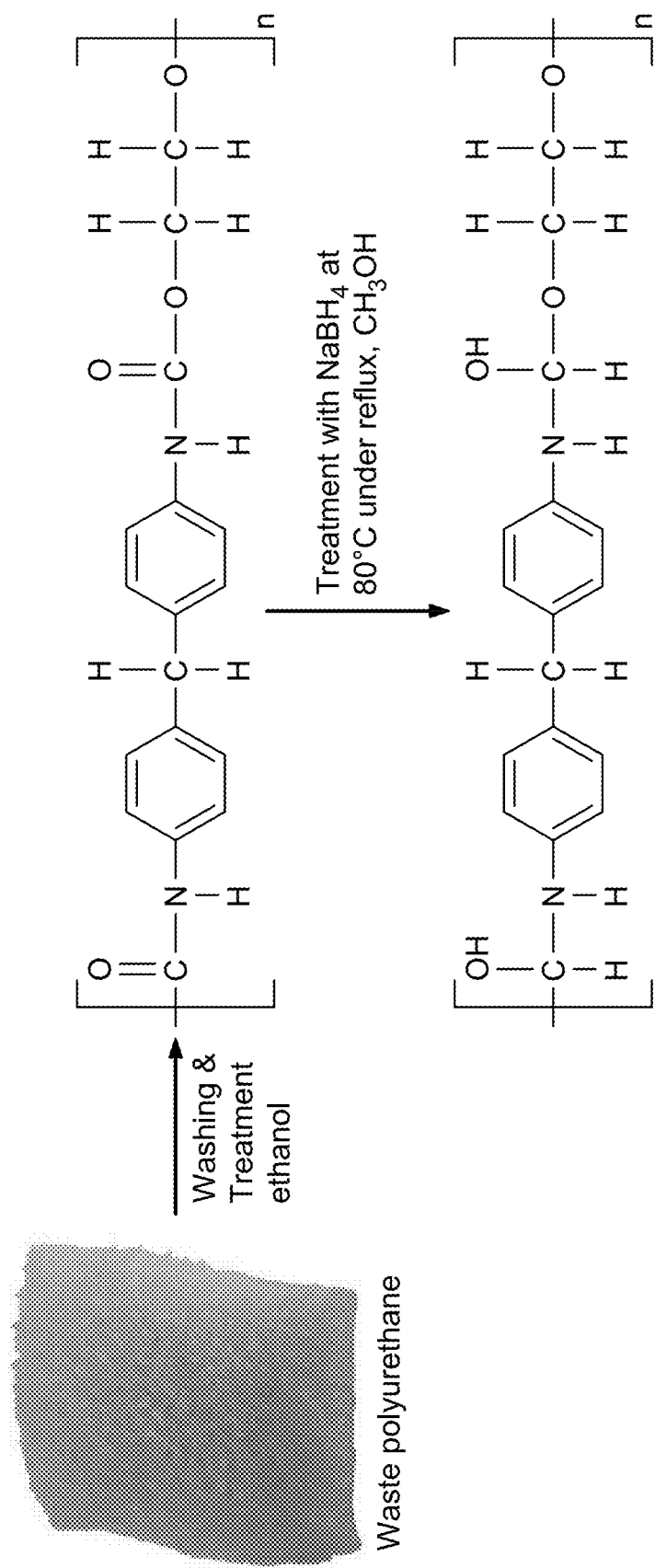
FIG. 7 is a schematic diagram depicting the conversion of polyurethane to active polyurethane, according to certain embodiments of the present disclosure.

Polyurethane pieces were cleaned in the ethanol for approximately 10 minutes and dried in an oven at 60° C. Then, the polyurethane was treated with sodium borohydride at 80° C., under reflux, in methanol. After 3 hours of treatment, the system was allowed to cool, and the activated polyurethane was collected and allowed to dry (FIG. 7).

Figure 8:
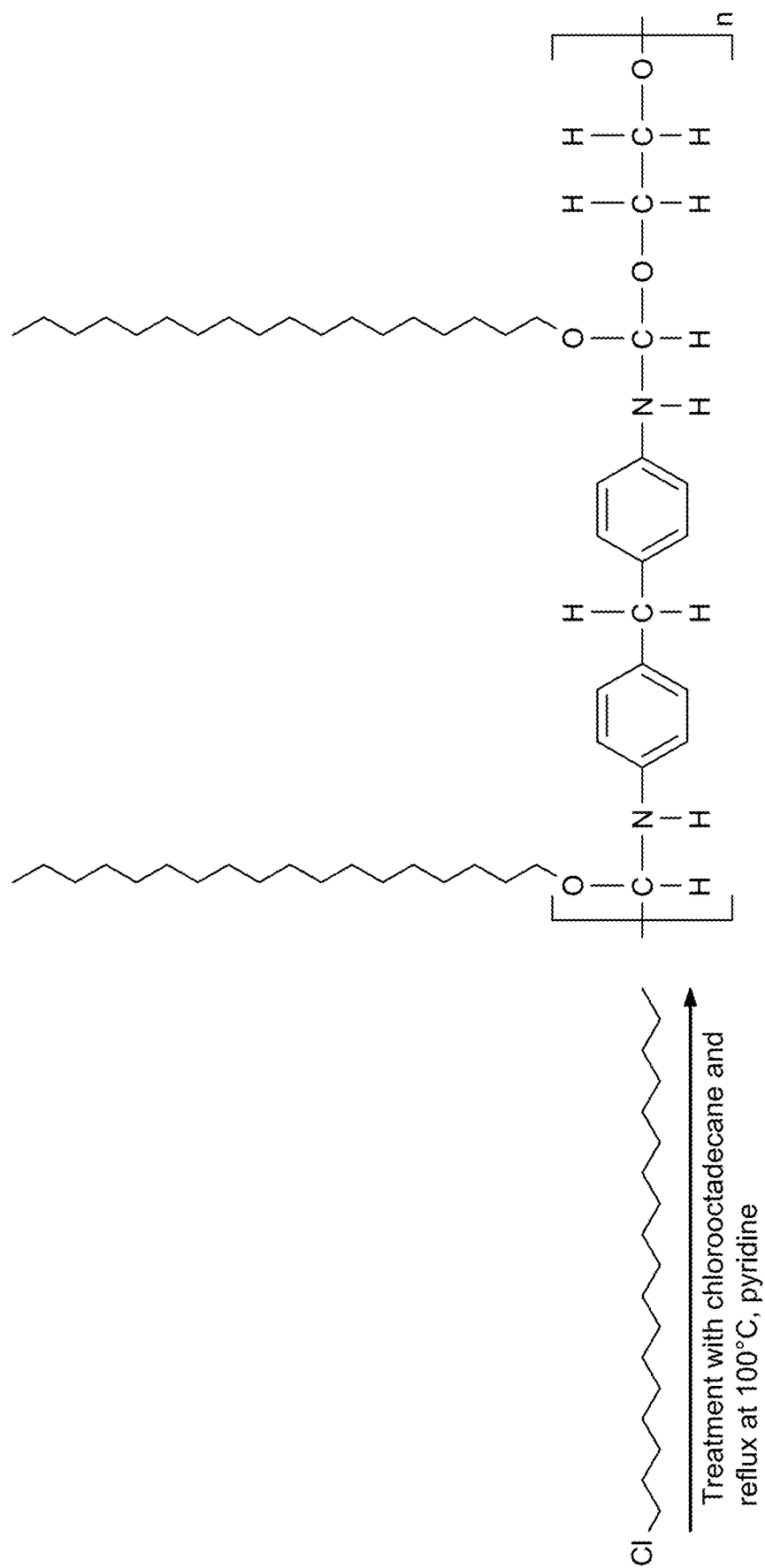
FIG. 8 is a schematic diagram depicting the functionalization of the active polyurethane with an alkyl group, according to certain embodiments of the present disclosure.

Then, the activated polyurethane was treated with chlorooctadecane in the presence of pyridine. The presence of an organic base such as pyridine provides a substantial concentration of chloride ions required for the final $S_N2$ reaction of the intermediate. The reaction was performed in a closed reflux system for 3 hours at 90° C. Then, the system was allowed to cool, and the modified polyurethane was collected and allowed to dry, as shown in FIG. 8.

Example 4: Separation of Oil from Oil-Water Mixture with the Second Membrane

Figure 9:
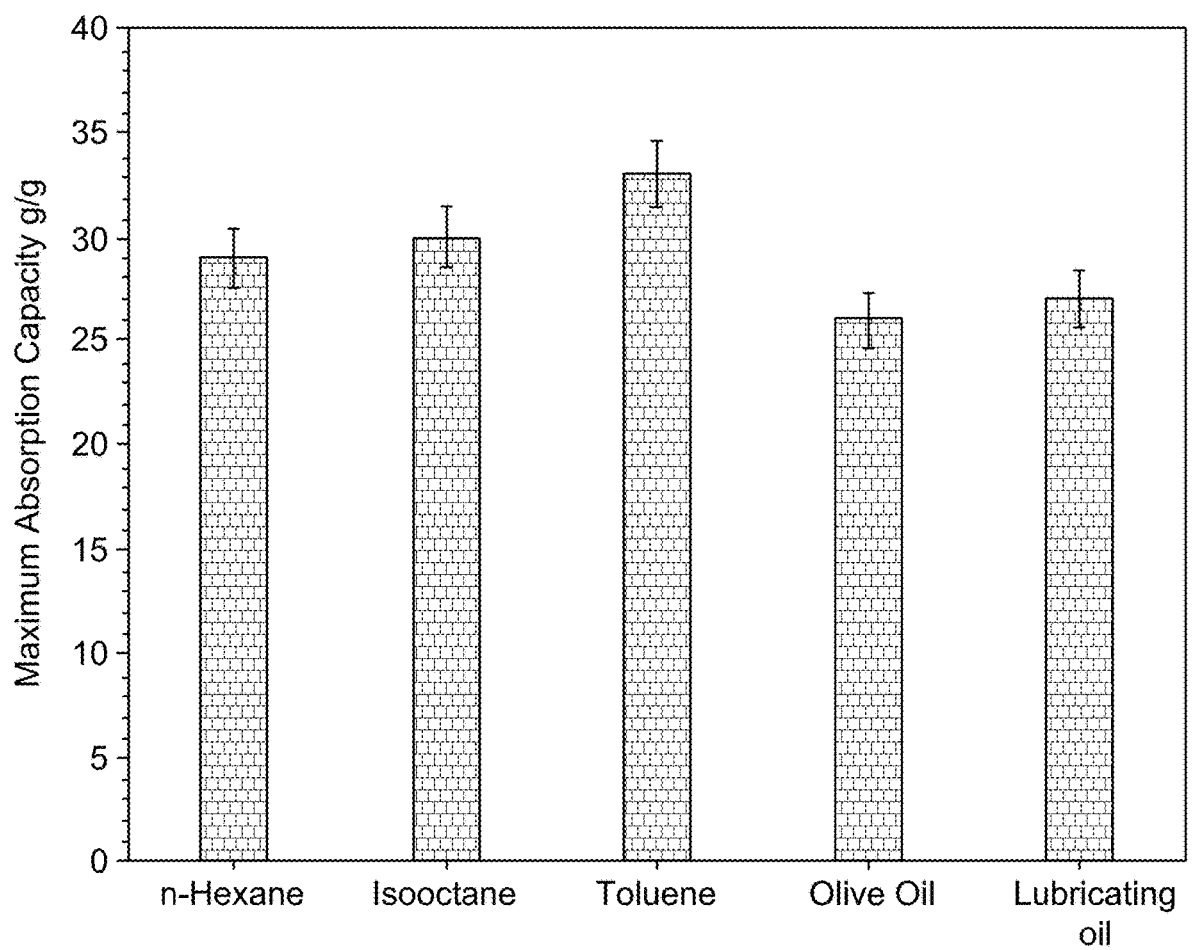
FIG. 9 is a graph depicting the absorption capacity of the modified polyurethane in the presence of various organic oily compounds, according to certain embodiments of the present disclosure.

In a simple squeezing technique, the modified polyurethane was immersed in oil-water mixtures for 10 seconds to get the foam saturated with the oil. After that, the foam saturated with the oil was weighed immediately to prevent the evaporation of solvents or oils. The absorption capacity (Q) of the modified polyurethane was tested using five different oils and organic solvents: toluene, isooctane, n-hexane, olive oil, and lubricating oil. Depending on the density and viscosity of the liquid, the modified polyurethane absorption capacity varies between 25 and 33 times its weight, as shown in FIG. 9. FIG. 9 shows the absorption capacity in decreasing order as toluene>isooctane>n-hexane>lubricating oil>olive oil.

Figure 10:
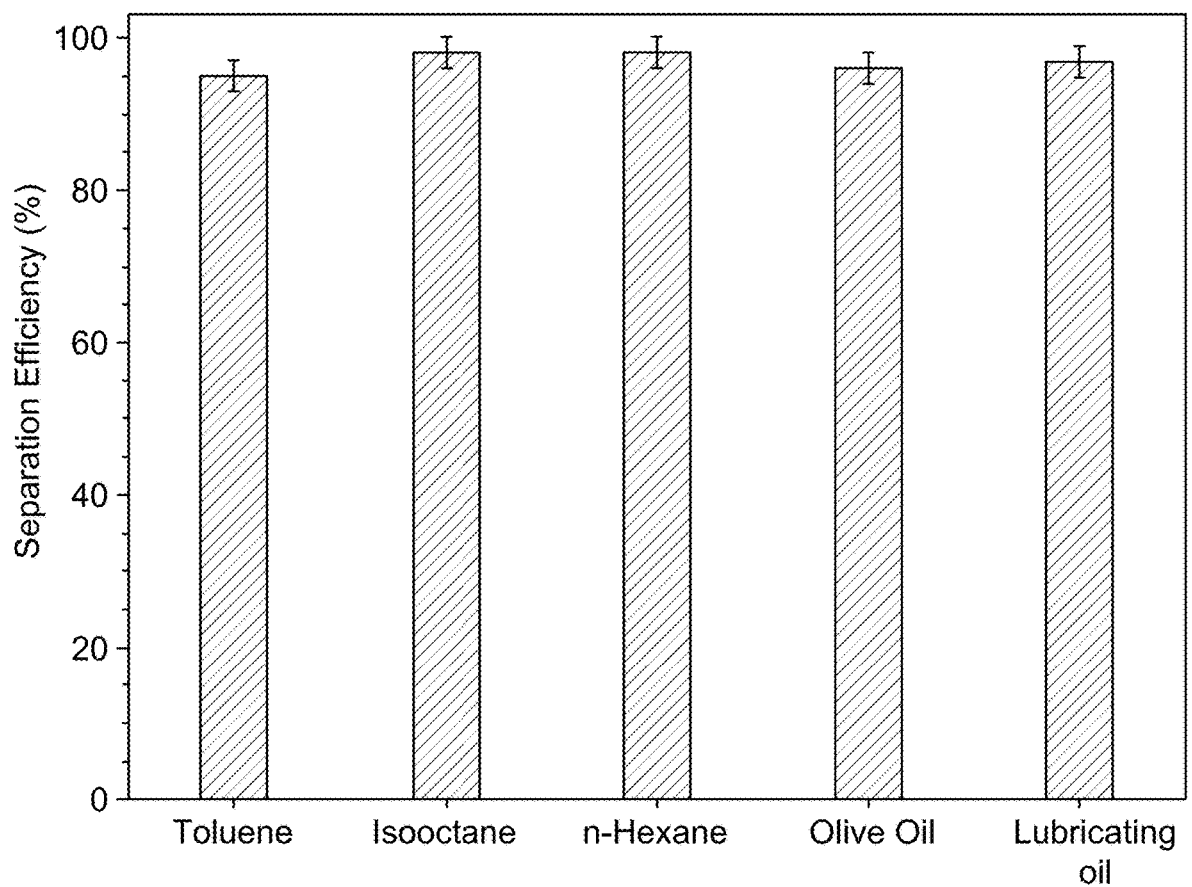
FIG. 10 is a graph depicting the separation capacity of the modified polyurethane in the presence of various organic oily compounds, according to certain embodiments of the present disclosure.

Separation efficiency was evaluated to assess the separation capacity of the modified polyurethane in an oil-water mixture. High separation efficiencies were obtained for toluene, isooctane, n-hexane, olive oil, and lubricating oil, respectively, as shown in FIG. 10. FIG. 10 shows the separation efficiency in decreasing order as isooctane~n-hexane>lubricating oil>olive oil~toluene.

The oil flux was determined by measuring the time required for an assured volume of oil to permeate through the modified polyurethane. The prepared modified polyurethane displayed a flux of 47,000, 33,000, 32,000, 26,000, and 23,000 Lm$^{-2}$h$^{-1}$ for n-hexane, toluene, isooctane, olive oil, and lubricating oil, respectively.

The present disclosure provides system 100 for efficient oil-water separation. The raw materials used to make system 100 are cheap and readily available. Furthermore, the present disclosure may use waste polystyrene and polyurethane, thereby obviating the need for expensive and complex materials in the preparation process. The first membrane 104 and the second membrane 106 are devoid of multi-step formation processes and demonstrate efficient water and oil flux.

Numerous modifications and variations of the present disclosure are possible in light of the above teachings. It is, therefore, to be understood that within the scope of the appended claims, the invention may be practiced otherwise than as specifically described herein.

The invention claimed is:

1. A system for separating an oil and water mixture, comprising:
   an oil and water mixture tank;
   a first membrane;
   a second membrane;
   a separated oil tank; and
   a separated water tank,
   wherein the first membrane comprises polystyrene,
   wherein the polystyrene is functionalized with tannic acid, wherein water passes through, and oil does not pass through the first membrane, wherein the second membrane comprises polyurethane, wherein the polyurethane is functionalized with an alkyl group, wherein oil passes through, and water does not pass through the second membrane.

2. The system of claim 1, wherein one or more styrene units of the polystyrene is functionalized with at least one oxygen atom, and wherein the tannic acid is covalently bonded to the polystyrene through the oxygen atom.

3. The system of claim 2, wherein the polystyrene is further functionalized with at least one compound selected from the group consisting of a glycol, a proanthocyanidin, an ellagitannin, and a flavonol, wherein the compound is covalently bonded to the polystyrene through the oxygen atom.

4. The system of claim 1, wherein the polystyrene has a weight average molecular weight of 10,000-400,000 grams per mole (g/mol).

5. The system of claim 1, wherein the polystyrene is syndiotactic.

6. The system of claim 1, wherein the polystyrene comprises 0.01 to 30 wt. % of the tannic acid based on the total weight of the polystyrene.

7. The system of claim 1, wherein the first membrane has a water flux of at least 25,000 liters per square meter per hour ($Lm^{-2}h^{-1}$) under gravity.

8. The system of claim 1, wherein the first membrane has a separation efficiency of at least 95%.

9. The system of claim 1, wherein the polystyrene is recycled from packing peanuts.

10. The system of claim 1, wherein a carbonyl group of one or more urethane units of the polyurethane is reduced and forms a covalent bond with the alkyl group.

11. The system of claim 1, wherein the polyurethane comprises reacted units of a diisocyanate compound and a polyol compound, wherein the polyol compound is selected from the group consisting of ethylene glycol, propylene glycol, glycerol, sucrose, and sorbitol.

12. The system of claim 1, wherein the alkyl group is an alkyl chain with at least one unsaturated bond.

13. The system of claim 1, wherein the alkyl group has 4 to 40 carbon atoms.

14. The system of claim 1, wherein the second membrane has an oil flux of at least 23,000 $Lm^{-2}h^{-1}$ under gravity.

15. The system of claim 1, wherein the second membrane has a separation efficiency of at least 95%.

16. The system of claim 1, wherein the polyurethane comprises 0.01 to 20 wt. % of the alkyl group based on the total weight of the polyurethane.

17. The system of claim 1, wherein the oil and water mixture tank has a first outlet connected to the first membrane and a second outlet connected to the second membrane, wherein the first membrane is connected to the separated water tank, and wherein the second membrane is connected to the separated oil tank.

18. The system of claim 1, further comprising a pump, wherein the pump is configured to pump the oil and water mixture through the first and second membranes.

19. The system of claim 1, wherein the oil is at least one selected from the group consisting of toluene, hexane, cyclohexane, dichloromethane, plant oil, isooctane, lubricating oil, crude oil, diesel oil, and gasoline.

20. The system of claim 1, wherein the oil and water mixture is wastewater or seawater after an oil spill.

\* \* \* \* \*